US012174122B2

(12) United States Patent
Slater et al.

(10) Patent No.: US 12,174,122 B2
(45) Date of Patent: Dec. 24, 2024

(54) INTENSITY CALIBRATION OF MULTIPASS RAMAN SYSTEMS USING STANDARD REFERENCE MATERIALS

(71) Applicant: Endress+Hauser Optical Analysis, Inc., Ann Arbor, MI (US)

(72) Inventors: Joseph B. Slater, Dexter, MI (US); James M. Tedesco, Livonia, MI (US)

(73) Assignee: Endress+Hauser Optical Analysis, Inc., Ann Arbor, MI (US)

( * ) Notice: Subject to any disclaimer, the term of this patent is extended or adjusted under 35 U.S.C. 154(b) by 0 days.

(21) Appl. No.: 17/937,141

(22) Filed: Sep. 30, 2022

(65) Prior Publication Data
US 2024/0110874 A1  Apr. 4, 2024

(51) Int. Cl.
*G01N 21/65* (2006.01)

(52) U.S. Cl.
CPC ... *G01N 21/65* (2013.01); *G01N 2201/12746* (2013.01)

(58) Field of Classification Search
CPC ............. G01N 21/65; G01N 2201/12746
See application file for complete search history.

(56) References Cited

U.S. PATENT DOCUMENTS

| 3,704,951 | A | 12/1972 | Chupp | |
|---|---|---|---|---|
| 5,377,004 | A | 12/1994 | Owen et al. | |
| 5,956,138 | A * | 9/1999 | Slater | G01J 3/30 |
| | | | | 356/417 |
| 7,496,245 | B2 * | 2/2009 | Saaski | G02B 6/4206 |
| | | | | 385/12 |
| 7,692,786 | B2 | 4/2010 | Tedesco et al. | |
| 8,824,042 | B2 * | 9/2014 | Tedesco | H01S 3/305 |
| | | | | 359/334 |
| 2012/0295249 | A1 * | 11/2012 | Cherubini | G01N 35/028 |
| | | | | 435/6.12 |
| 2020/0209602 | A1 * | 7/2020 | Pau | G01M 11/331 |
| 2020/0348173 | A1 * | 11/2020 | Norwood | G01N 21/278 |
| 2021/0129442 | A1 * | 5/2021 | Winiarski | B22F 10/36 |

OTHER PUBLICATIONS

Choquette, et al., Relative Intensity Correction of Raman Spectrometers: NISA SRMs 2241 Through 2243 for 785 nm, 532 nm, and 488 nm/514.5 nm Excitation, Applied Spectroscopy, DOI: 10.1366/0003702077994785, vol. 61, No. 2, Mar. 2007, https://www.researchgate.net/publication/6475958, 14 pp.

* cited by examiner

*Primary Examiner* — Tarifur R Chowdhury
*Assistant Examiner* — Roberto Fabian, Jr.
(74) *Attorney, Agent, or Firm* — Kelly J. Smith; Endress+Hauser (USA) Holding, Inc.

(57) ABSTRACT

A calibration reference for a multipass Raman analysis system, wherein a combination excitation and collection beam passes through a focal point $F_0$ within a sample volume multiple times, is provided. The calibration reference includes a body of material having a known spectral response when illuminated by the combination excitation and collection beam. The size or shape of the body is selected or modified to keep the focal point at $F_0$ within the body when the body is positioned within the sample volume for calibration purposes.

20 Claims, 6 Drawing Sheets

INTENSITY CALIBRATION OF MULTIPASS RAMAN SYSTEMS USING STANDARD REFERENCE MATERIALS

TECHNICAL FIELD

This present disclosure relates generally to Raman spectroscopy and, in particular, to multipass Raman systems and, more particularly, to the calibration of multipass Raman systems.

BACKGROUND

Spectroscopy is the study of the interaction between matter and electromagnetic radiation Raman spectroscopy is a form of vibrational spectroscopy based on the Raman effect, which is the alteration of the frequency and phase of light as it passes through a transparent medium. Essentially, the Raman effect is a change of frequency and wavelength exhibited by some of the light scattered in the medium. This spectroscopic technique is used to detect vibrational, rotational, and other states in a molecular system, capable of discerning the chemical composition of materials. The effect is specific to the molecules which cause it, and so can be used in spectroscopic analysis.

A spectrometer, such as a Raman spectrometer, or probe, is used to carry out these analysis techniques and others, and includes at least an emission source, optical system, and detecting device. Each spectrometer has a unique spectral response, impacted by the spectral modification caused by the optical elements along the light path, such as, for example, lenses, mirrors and/or detectors. Thus, spectrometers for use in spectroscopic analysis should be calibrated, such as by using a spectral reference material. That is, the spectrometer may collect a spectrum of light passing through a spectral reference material having a predetermined, or known, spectral signature to adjust, or correct, the spectral response. This calibration is important for obtaining consistent results from device to device.

Relative intensity correction may be obtained when a certified material is analyzed with a Raman spectrometer. While elemental samples and gasses have been used in the past, the ASTM Subcommittee of Raman Spectroscopy of the National Institute of Standards and Technology (NIST) has developed a suite of standard reference materials (SRMs) to promote accuracy, uniformity and transferability. In each case, the SRM is a sample of optical glass that emits a broadband luminescence spectrum when illuminated with the Raman excitation laser. SRMs 2241 through 2243, for example, are certified spectroscopic standards intended for the correction of the relative intensity of Raman spectra obtained with instruments employing laser excitation wavelengths of 785 nm, 532 nm, or 488 nm/514.5 nm.

During calibration, the luminescent spectrum can be characterized with an analytical expression to create a spectrum that is free from relative interference from the spectrometer arrangement. More specifically, the shape of the luminescence spectrum may be described by a polynomial expression that relates the relative spectral intensity to the Raman shift. This polynomial, together with a measurement of the luminescence spectrum of the standard, can be used to determine the spectral intensity-response correction, which is unique to each Raman system. Ideally, the resulting instrument intensity response correction may be used to obtain Raman spectra that corrects for instrument-dependent variation.

When obtaining Raman spectra of gases or other nominally transparent fluids, it is desirable to generate as much signal as possible. Several techniques have been developed to increase these signal levels. One approach, described in U.S. Pat. No. 5,956,138, relies on "multipass" techniques that produce a multiplicity of focal images. Another approach, disclosed in U.S. Pat. No. 7,692,786 uses retro reflections. Each copy of the focal image adds to the overall signal level and controls signal level. Certain proposed Raman systems use ellipsoidal reflectors, since rays passing through one point are directed to the other. However, the ellipsoidal reflectors in existing systems are typically used for beam redirection as opposed to signal amplification. For example, U.S. Pat. No. 3,704,951 uses mirrors, which may be ellipsoidal, in such relation to a sample zone that source light is caused to pass many times through a sample in that zone for increasing substantially the intensity level of Raman light emission from the sample.

U.S. Pat. No. 8,824,042, incorporated herein by reference, describes a Raman signal amplifier based upon ellipsoidal reflection to enhance both laser excitation and signal collection efficiency. Such apparatus comprises an ellipsoidal reflector providing a first real focus f1, and second real or virtual focus f2, both foci being situated within a sample volume. The optical arrangement is such that when an input laser excitation beam having an initial numerical aperture (NA) is focused onto one of the foci, the beam is reflected by the reflector and refocused onto alternating foci, such that the NA of the reflected optical path progressively increases for higher efficiency collection of Raman emissions from the multiple foci.

A problem arises when attempting to use an existing, commercially available SRM in a Raman system that relies upon multipass techniques. In particular, when using an SRM glass as a calibration light source with multipass collection arrangements, both sides of the sampling zone are being used for data collection, such that the sample used for calibration blocks half the ray paths intended for calibration. Being substantially transparent, as the ray paths penetrate the SRM, the index mismatch of the glass to the sample causes aberrations that distort ray path integrity. The phenomenon is particularly in gaseous samples, less so in liquids but nevertheless unacceptable.

SUMMARY

A calibration reference for a multipass Raman analysis system, wherein a combination excitation and collection beam passes through a focal point F0 within a sample volume multiple times, is provided. The calibration reference includes a body of material having a known spectral response when illuminated by the combination excitation and collection beam. The size or shape of the body is selected or modified to keep the focal point at F0 within the body when the body is positioned within the sample volume for calibration purposes.

BRIEF DESCRIPTION OF THE DRAWINGS

The present disclosure is explained in further detail below on the basis of the exemplary embodiments shown in the figures. Shown are.

DETAILED DESCRIPTION

Figure 1:
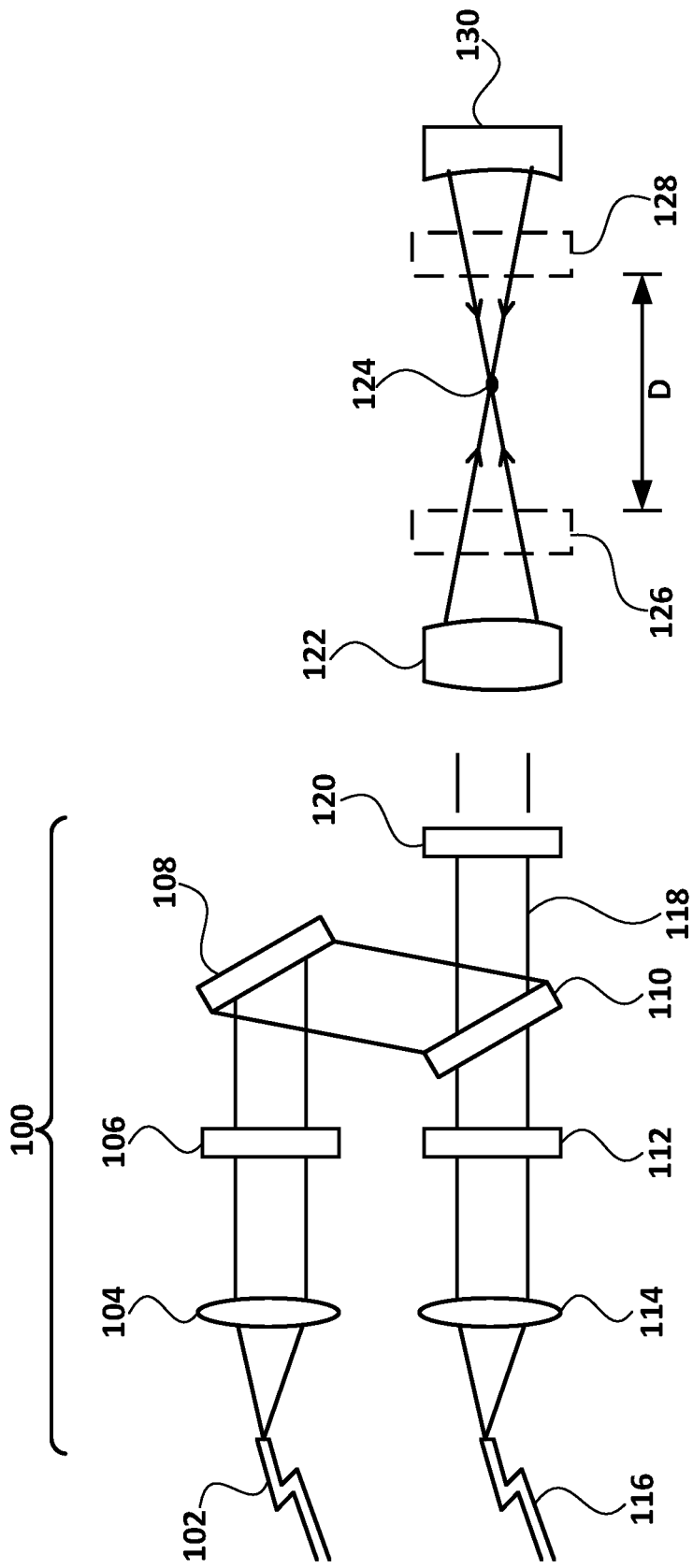
FIG. 1 illustrates a simplified schematic diagram of a multipass Raman arrangement applicable to the present disclosure, shown without a calibration material.

FIG. 1 is a simplified schematic diagram of a multipass Raman arrangement applicable to the present disclosure, shown without a calibration material. The system is a fiber-coupled probe configuration, with the understanding that the present disclosure is equally applicable to direct-coupled (i.e., non-fiber) installations. Reference 100 represents a remote fiber probe of the type shown and described in U.S. Pat. No. 5,377,004, entitled "Remote Optical Measurement Probe," (hereinafter '004 patent) incorporated herein by reference. Excitation is delivered via fiber 102, collimated by element 104, filtered with bandpass filter 106, and merged into combined excitation/collection beam 118 using narrowband reflective element 108 and beam combiner 110. Laser excitation is notch filtered at 112 from the collection beam, which is focused by element 114 onto collection fiber 116. This geometry is shown in FIG. 4C of the '004 patent, with the understanding that the present disclosure is not limited in terms of excitation or collection beam configurations.

Combined excitation/collection beam 118 may pass through a window 120 depending upon the arrangement of the system, with focusing optic 122 being used to focus the combined beam onto point 124 within the sampling volume. The beam is then refocused by element 130 back onto point 124. The present disclosure is applicable to any such multipass arrangement using different elements to achieve multiple passes through the sample point 124. For example, elements 122, 130 may be transmissive or reflective. It may further be assumed that element 130, if reflective, may be a generic confocal retroreflector, whether parabolic, hyperbolic, and so forth. While this particular configuration generates roughly four times the theoretical amplification of the Raman signal (i.e., 2× excitation plus 2× the collection aperture), the present disclosure is also applicable to configurations with a higher number of passes and increased amplification.

Continuing the reference to FIG. 1, the sample may be a liquid or gas, within a volume defined by opposing windows 126, 128 having a depth D, and wherein most or all of the optical components are disposed outside of this sample volume. Regardless, note that the optical elements responsible for the multipass operation are intentionally chosen to accommodate the refractive index of the sample (Ns).

Figure 2:
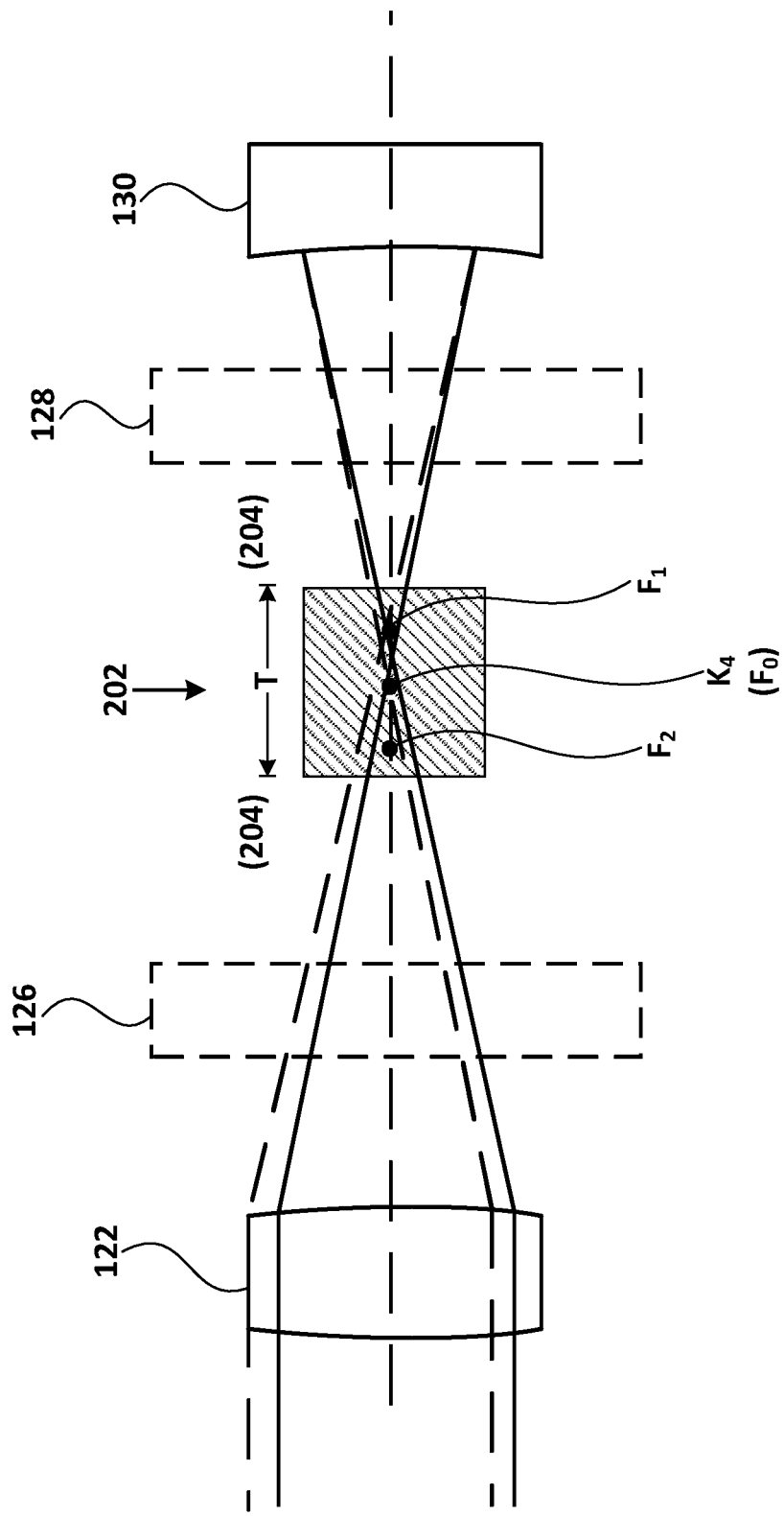
FIG. 2 illustrates a problem encountered when a conventional, solid reference material such as an SRM 202 is used within the sample volume.

FIG. 2 illustrates the problem encountered when a conventional, solid reference material such as an SRM 202 is used within the sample volume. The source and destination of counter-propagating excitation/collection beam 118 has been eliminated to better describe the problem. If the sample space is merely filled with a full or partial depth of SRM or other calibration material, the critical path length of the volume increases, focal positions shift and no longer overlap at the focal point 124.

In particular, with a conventional sample in place as shown, the first and reflected foci are both at position F0, overlapping. However, since the SRM has a higher refractive index (NSRM) than the surrounding gas or liquid sample 204, the first incident focus shifts to F1, and the second reflected focus shifts to F2. This shifting of foci is proportional to the relative refractive index of the calibration material used (NSRM—NS) and the thickness of the material, T. This situation, which is exacerbated by additional passes and differences in calibration material shapes and sizes, prevents accurate intensity calibration between instruments despite the characteristics of the material used.

For example, if glass is used as the SRM and the sample to be analyzed is a gas, a large difference exists between the refractive index of the SRM and the refractive index of the sample. This large difference results in greater shifting of the ray paths. To accommodate this and improve calibration, ray paths of the actual spectral measurement of the sample and the ray paths through the SRM need to be as close as possible. This can be accomplished by appropriately curving the SRM glass external surfaces to reduce or eliminate its shifting of the ray paths relative to the ray paths through the sample.

The subject matter of the present disclosure minimizes and ideally prevents shifting foci within a reference material used in conjunction with a multipass spectroscopic analysis system. In broad and general terms, lensing techniques are applied to the reference material to make the reference material appear to be at the same index as its environment. Stated differently, in accordance with the present disclosure, the reference material is intentionally sized or shaped so that incident and reflected focus of the combined excitation/collection beam remains at the same point (i.e., F0) at each pass—initial and subsequent—through the reference material during calibration In accordance with the present disclosure, a spherical reference material with its center at the focal point should accomplish this task by making all the relevant ray paths normal to the interface. The smaller the sphere the more effective this approach would be. However, in practice, different shapes, including shapes with aspherical surfaces, may be more effective with actual focal volumes encountered in practical Raman multipass cells as opposed to focal-point-centric approaches.

Figure 3:
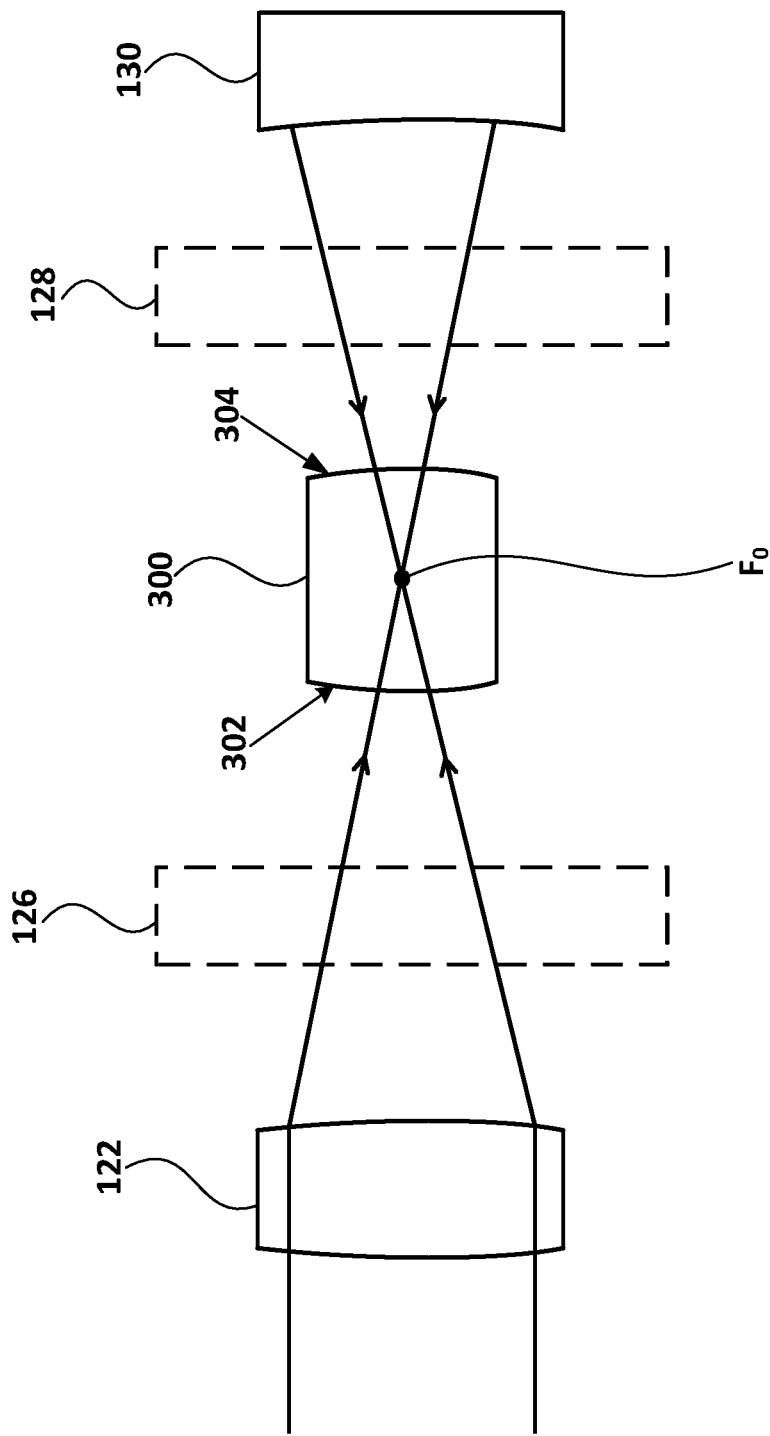
FIG. 3 illustrates a reference material shaped to provide opposing confocal surfaces resulting in a biconvex shape wherein the radius defining each surface is centered on the original focus F0.

In the embodiment of FIG. 3, for example, the reference material 300 is shaped to provide opposing confocal surfaces 302, 304, resulting in a biconvex shape wherein the radius defining each surface 302, 304 is centered on the original focus F0. Using this and other approaches described herein, the size of the reference material is inconsequential.

Figure 4:
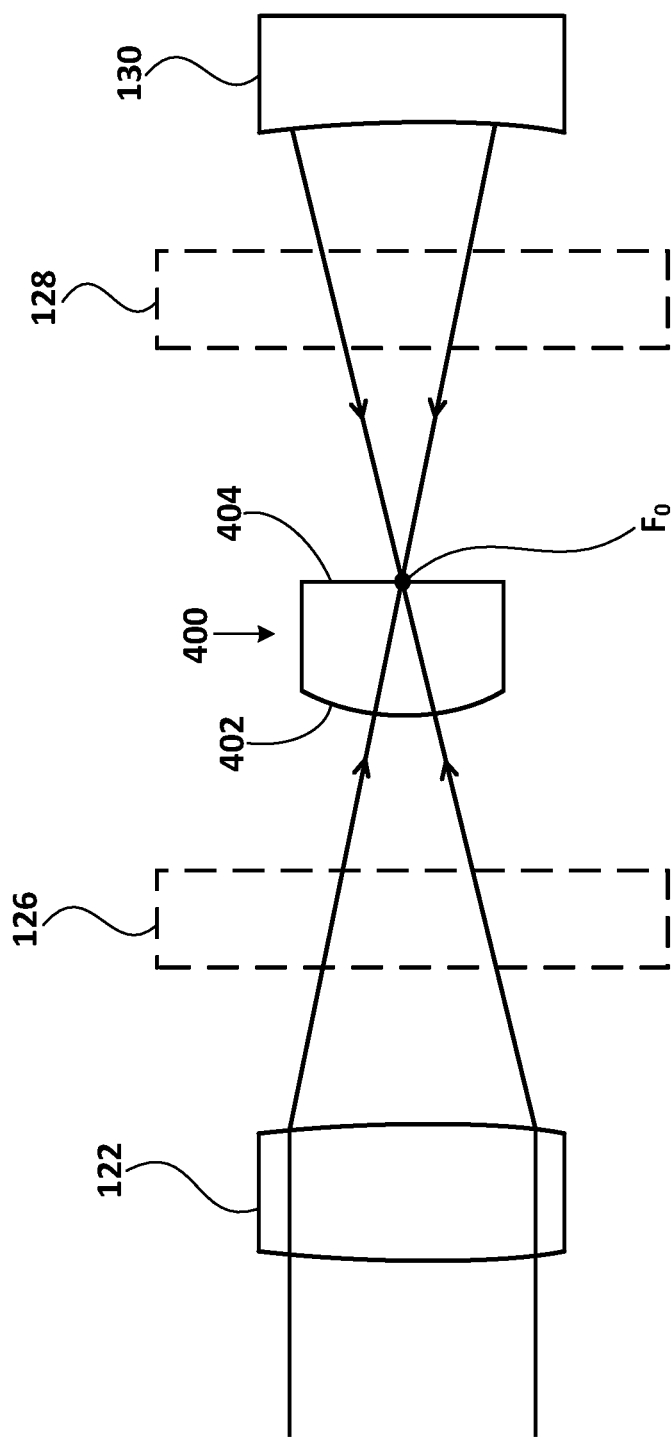
FIG. 4 illustrates an alternative embodiment wherein the incident surface is curved with a radius centered on focus F0, but wherein F0 is slightly beneath the opposing surface.

FIG. 4 is an alternative embodiment wherein the incident surface 402 is curved with a radius centered on focus F0, but wherein F0 is slightly beneath the opposing surface 404. In this case the reflected beam (at a somewhat larger angle due to the absence of the reference material) is not modified by the index mismatch, such that focus shifting is limited or does not occur. Note that surface 404 may assume any shape since proximity of F0 within the material to the surface is most critical. However, for cost and manufacturing considerations a planar surface 404 is adequate.

Figure 5:
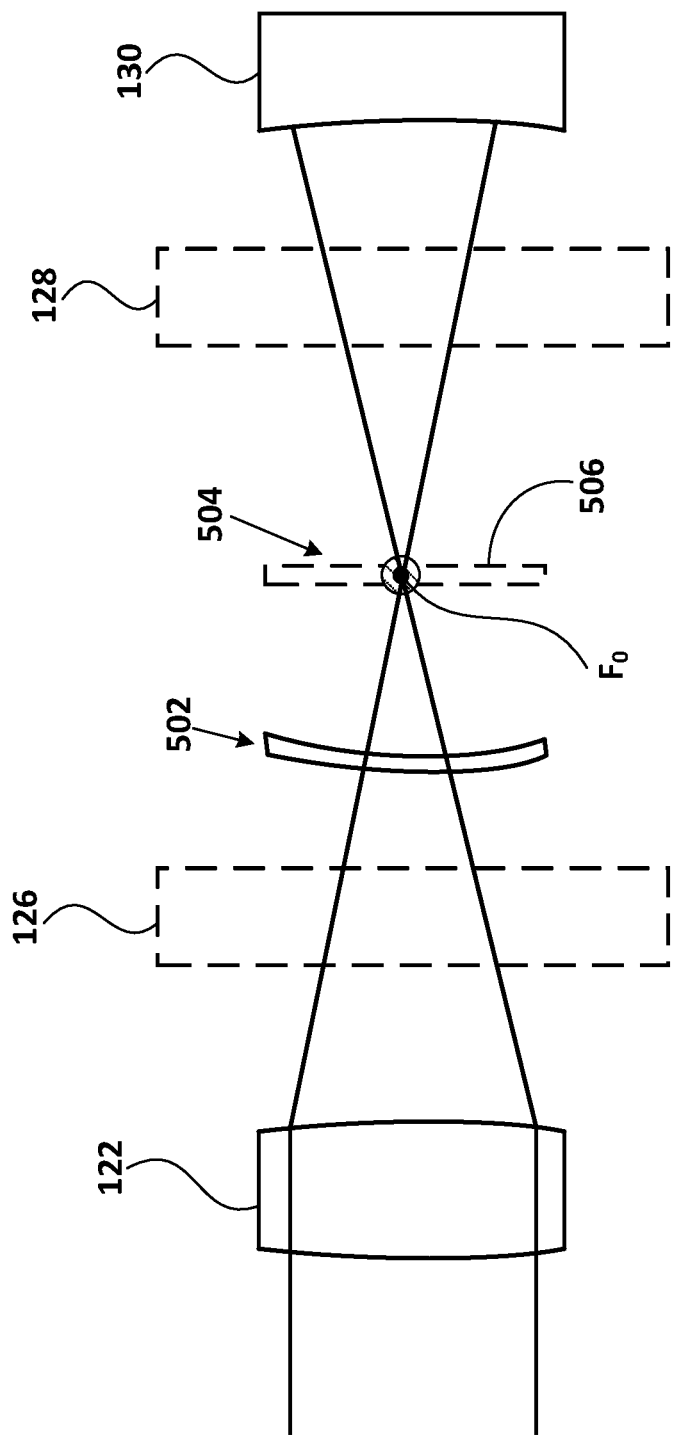
FIG. 5 illustrates a thin confocally-shaped reference material that may be used at any position between F0 and window.

If the reference material is made sufficiently small, the effects of index mismatching may be reduced in accordance with further embodiments of the present disclosure. As examples, as depicted in FIG. 5, a thin confocally-shaped reference material 502 may be used at any position between F0 and window 126. Alternatively, a small sphere 504 or thin section 506 may be used in direct overlapping registration with the focal point F0. The smaller or thinner the material, the less focal shifting would be experienced due to the index mismatching of the reference material.

Figure 6:
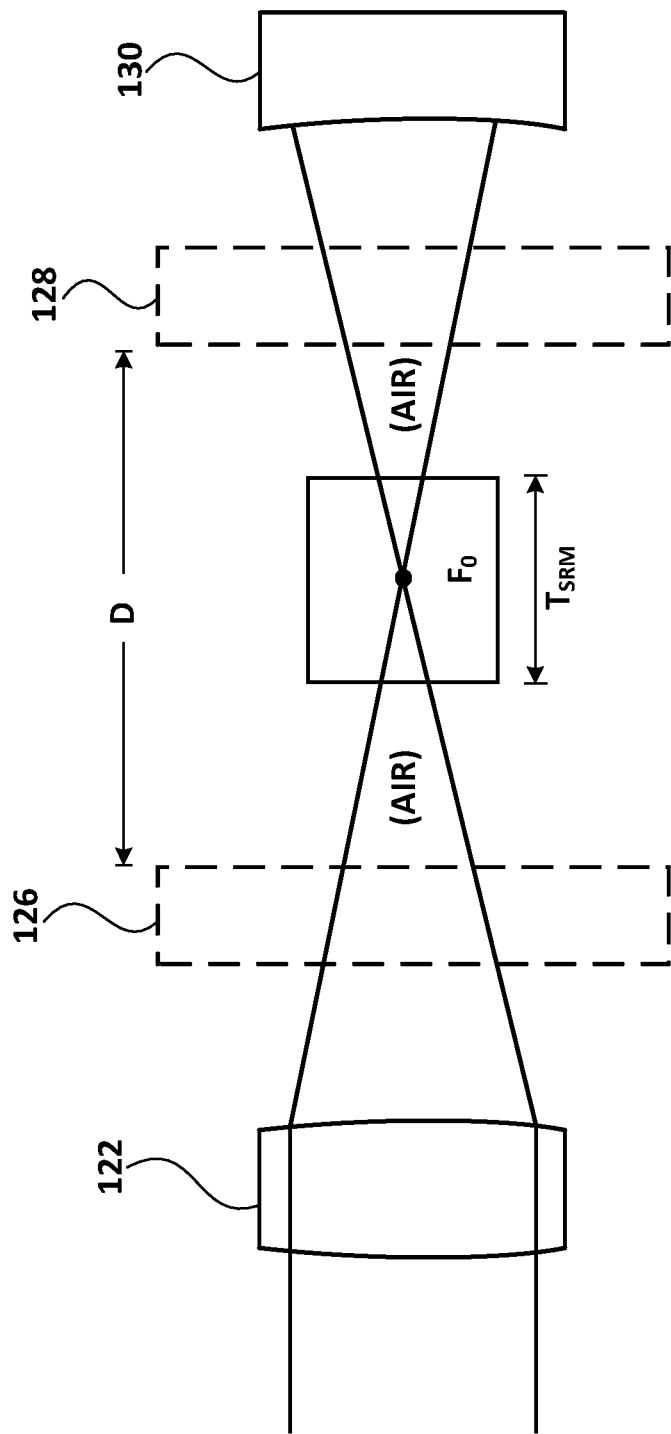
FIG. 6 illustrates the relative thickness of NSRM and NAIR which can be balanced such that the total path length equals that of the total path length D of the sample.

If the sample is a liquid or aqueous (as opposed to gaseous), the relative thickness of NSRM and NAIR can be balanced such that the total path length equals that of the total path length D of the sample, as shown in FIG. 6. For example, about 10% of glucose in water has an index NS of about 1.35. If NS is sufficiently less that NSRM, the effect of the index mismatch may be reduced to an acceptable level. If the reference material is NIST glass, NSRM is about 1.52 which is substantially greater than 1.35. To balance the total path length, NS×D=NSRM×TSRM+(D−T)×NAIR As one example, with a path length D of 4 mm, a 2.6 mm thickness of SRM may be used since:

2.6 mm×1.52 (NSRM)+(4−2.6)×1 (NAIR)~4 mm×1.33 (NS in water)

The dimensions and shapes will be driven by a) the diameter of the collimated path from the probe head optics and b) the interrogated length of the flow path, D. i.e. focusing lens 122 will be sized to accept and focus that entire beam diameter. In our product case, that dimension will typically be on the order of 5-10 mm. The flow path D can vary depending on the application, from a minimum approaching 1 mm to a maximum for some very low volume liquid applications, to 40 or 50 mm in our gas probes. Those combined with the beam diameter will determine the dimensions of the windows and SRM.

The invention claimed is:

1. A calibration reference for a multipass Raman analysis system wherein a combination excitation and collection beam passes through a focal point $F_0$ within a sample volume multiple times, the calibration reference comprising:
   a body of material having a known, predetermined spectral response when illuminated by the combination excitation and collection beam; and
   wherein a size or a shape of the body is selected or modified to keep the focal point at $F_0$ within the body when the body is positioned within the sample volume for calibration purposes;
   wherein a surface of the body of material is altered to compensate for a mismatch in material optical properties of the body of material and a sample to be positioned within the sample valume;
   wherein the body of material is configured to reduce shifting and increase matching of the optical property index of the sample and the refractive index of the body of material.

2. The calibration reference of claim 1, wherein the body is a fluorescent glass.

3. The calibration reference of claim 1, wherein:
   the body has opposing surfaces through which the combination excitation and collection beam enters and exits; and
   at least one of the surfaces is curved with a radius of curvature centered on the focal point $F_0$.

4. The calibration reference of claim 1, wherein:
   the body has opposing surfaces through which the combination excitation and collection beam enters and exits; and
   both of the opposing surfaces are curved with a radius of curvature centered on the focal point $F_0$.

5. The calibration reference of claim 1, wherein:
   the body has opposing surfaces through which the combination excitation and collection beam enters and exits; and
   wherein a distance between the opposing surfaces is less than a depth of the sample volume.

6. The calibration reference of claim 1, wherein:
   the sample volume defines a depth;
   the body has opposing surfaces through which the combination excitation and collection beam enters and exits, and wherein a distance between the opposing surfaces defines a thickness;
   the body has an index of refraction that is greater than an index of refraction of the sample; and
   the body is configured such that the total path length of the combination excitation/collection beam through the body with air in the sample volume corresponds with a liquid sample in the sample volume for Raman analysis.

7. The calibration reference of claim 1, wherein:
   the body is spherical, with a center of the body corresponding to the focal point $F_0$.

8. The calibration reference of claim 1, wherein an incident surface of the body is curved with a radius centered on the focal point $F_0$, and an opposing surface of the incident surface is planar.

9. The calibration reference of claim 1, wherein dimensions and shapes of the body are based on a diameter of a collimated path from probe head optics.

10. The calibration reference of claim 1, wherein dimensions and shapes of the body are based on an interrogated length of the flow path.

11. A method for calibrating a multipass Raman analysis system, wherein a combination excitation and collection beam passes through a focal point $F_0$ within a sample volume multiple times, using a calibration reference, the method comprising:
   positioning a body of material of the calibration reference within the sample volume, wherein the body of material has a known, predetermined spectral response when illuminated by the combination excitation and collection beam;
   wherein a size or shape of the body is selected or modified to keep the focal point at $F_0$ within the body when the body is positioned within the sample volume for calibration purposes;
   illuminating the body of material by the combination excitation and collection beam; and
   adjusting a spectral response of a spectrometer of the multipass Raman analysis system based on the known, predetermined spectral response of the body of material;
   wherein a surface of the body of material is altered to compensate for a mismatch in material optical properties of the body of material and a sample to be positioned within the sample volume;
   wherein the body of material is configured to reduce shift and increase matching of the material optical properties of the sample and the refractive index of the body of material.

12. The method of claim 11, wherein the body is a fluorescent glass.

13. The method of claim 1, wherein:
   the body has opposing surfaces through which the combination excitation and collection beam enters and exits; and
   at least one of the surfaces is curved with a radius of curvature centered on the focal point $F_0$.

14. The method of claim 1, wherein:
the body has opposing surfaces through which the combination excitation and collection beam enters and exits; and
both of the opposing surfaces are curved with a radius of curvature centered on the focal point $F_0$.

15. The method of claim 1, wherein:
the body has opposing surfaces through which the combination excitation and collection beam enters and exits; and
wherein a distance between the opposing surfaces is less than a depth of the sample volume.

16. The method of claim 1, wherein:
the sample volume defines a depth;
the body has opposing surfaces through which the combination excitation and collection beam enters and exits, and wherein a distance between the opposing surfaces defines a thickness;
the body has an index of refraction that is greater than an index of refraction of the sample; and
the body is configured such that the total path length of the combination excitation/collection beam through the body with air in the sample volume corresponds with a liquid sample in the sample volume for Raman analysis.

17. The method of claim 1, wherein:
the body is spherical, with a center of the body corresponding to the focal point $F_0$.

18. The method of claim 11, wherein an incident surface of the body is curved with a radius centered on the focal point $F_0$, and an opposing surface of the incident surface is planar.

19. The method of claim 11, wherein dimensions and shapes of the body are based on a diameter of a collimated path from probe head optics.

20. The method of claim 11, wherein dimensions and shapes of the body are based on an interrogated length of the flow path.

* * * * *